J. MALLON.
SUGAR-MILL.

No. 182,377. Patented Sept. 19, 1876.

WITNESSES:
Chas. Nida
John Goethals

INVENTOR:
James Mallon
BY Munn & Co.
ATTORNEYS.

UNITED STATES PATENT OFFICE.

JAMES MALLON, OF BATON ROUGE, LOUISIANA.

IMPROVEMENT IN SUGAR-MILLS.

Specification forming part of Letters Patent No. 182,377, dated September 19, 1876; application filed May 9, 1876.

*To all whom it may concern:*

Figure 1:
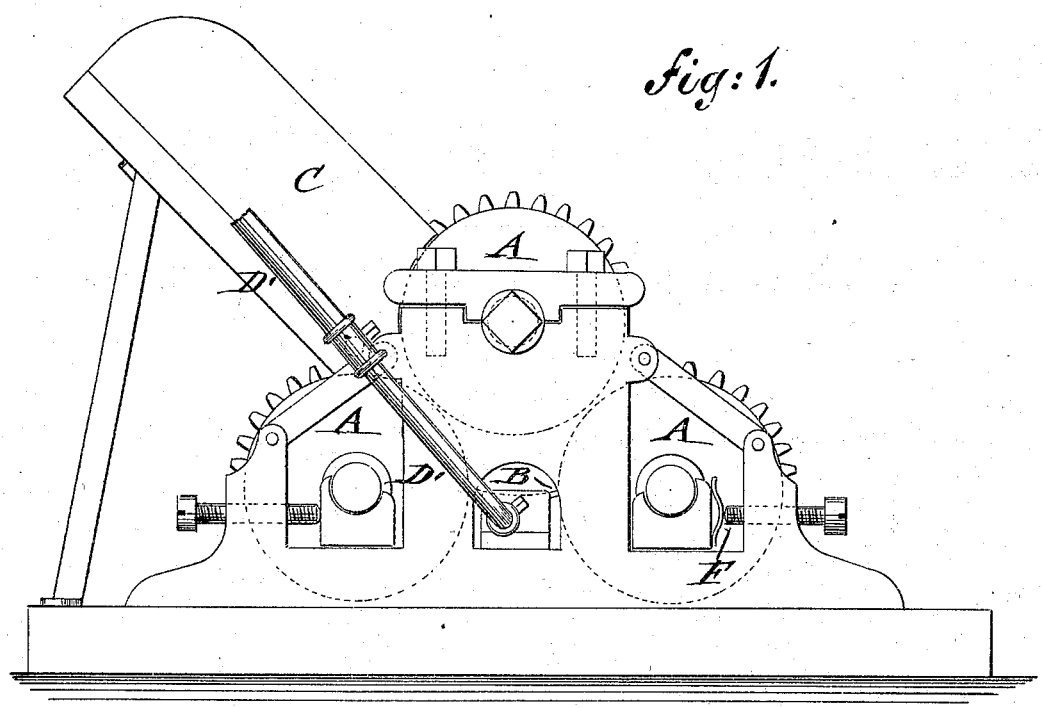
Figure 2:
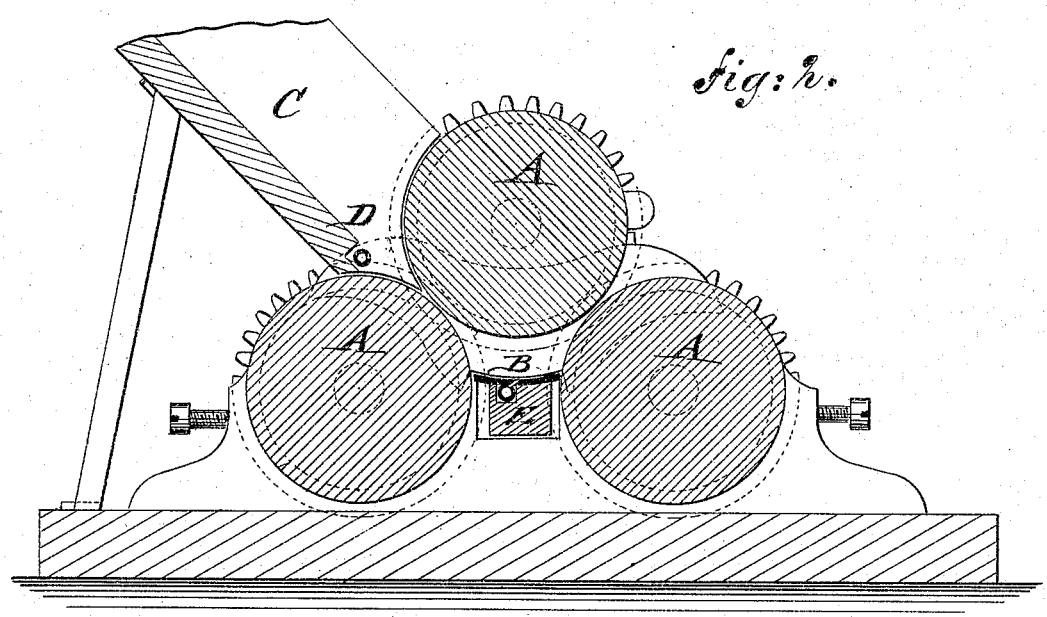

Be it known that I, JAMES MALLON, of Baton Rouge, parish of East Baton Rouge, Louisiana, have invented a new and Improved Sugar-Mill, of which the following is a specification:

Figure 1 represents a side elevation, and Fig. 2 a vertical longitudinal section, of my improved sugar-mill.

Similar letters of reference indicate corresponding parts.

My invention relates to such improvements in sugar-mills that a greater yield of sugar and juice is obtained from the cane, and also a superior bagasse for manuring purposes.

The invention consists of a sugar-mill, arranged with a perforated steam-pipe in front of the receiving-rollers, and one or more perforated steam-pipes in the cane-knife for forcing small jets of steam up through the cane as it passes over the knife or turn-plate.

In the drawing, A represents the crushing-rollers of a sugar-mill; B, the knife that extends laterally between the rollers; and C, the hopper or chute for conveying the cane to the rollers. At the corner part of the hopper-chute C, and in front of the point of contact of the receiving-rollers, is arranged a lateral perforated steam-pipe, D, that forces small jets of steam on the cane when entering the rollers. The steam dampens the dry cane leaves or trash, and prevents them from absorbing large quantities of cane-juice, besides softening the cane and rendering it more easy to crush. The steam is applied and regulated by a connecting-pipe, D', and steam-cock. The steam-supply pipe D' is extended downward and connected to one or more lateral pipes, E, lying in the cane-knife or turn-plate. The pipe E is perforated in the same manner as the pipe D to throw jets of steam through perforations or channels of the knife on the cane inclosed in a space between the rollers and the knife. The steam is confined in this space, and thereby forced through the cane, so as to heat and wash both the sugar and juice almost entirely out of the cane. Between the journal-bearings of the lower bagasse-roller A and the set screws are interposed strong cushioning-springs F, that make the roller self-adjusting, so that the same gives to some extent, and avoids the danger of breaking mill-housings and gear-wheels.

The adjustability of the bagasse-roller produces a greater yield of juice, as the roller adapts itself to the greater or less quantity fed to the mill.

The cane so crushed and steamed forms a bagasse of short pieces, from which nearly all sugar and juice is extracted, so that it can be applied directly as manure, being comparatively free from acid, and liable to rot in a considerable less time than the ordinary bagasse of the mills at present in use.

Having thus described my invention, I claim as new and desire to secure by Letters Patent—

The combination, in a sugar-mill, with crushing-rolls A, of the steam-pipe and cane-knife, both perforated and arranged substantially as and for the purpose specified.

JAMES MALLON.

Witnesses:
HENRY VON PHUL,
WM. WARD.